United States Patent [19]
Wachi et al.

[11] Patent Number: 4,910,260
[45] Date of Patent: Mar. 20, 1990

[54] VULCANIZABLE FLUORORUBBER COMPOSITION

[75] Inventors: Hiroshi Wachi, Ebina; Takeo Kaneko, Yokohama, both of Japan

[73] Assignee: Asahi Glass Company, Ltd., Tokyo, Japan

[21] Appl. No.: 254,729

[22] Filed: Oct. 7, 1988

[30] Foreign Application Priority Data

Oct. 9, 1987 [JP] Japan ................................ 62-253744

[51] Int. Cl.[4] ............................................ C08F 259/08

[52] U.S. Cl. .................................... 525/260; 525/262; 525/263; 525/264; 525/265; 525/281; 525/326.3

[58] Field of Search ............... 525/260, 262, 263, 264, 525/265, 281

[56] References Cited

U.S. PATENT DOCUMENTS 4,141,874 2/1979 Oka et al. ............................ 525/276
4,446,270 5/1984 Guenthner et al. ................. 525/276
4,603,175 7/1986 Kawachi et al. .................... 525/276

*Primary Examiner*—Joseph L. Schofer
*Assistant Examiner*—Bernard Lipman
*Attorney, Agent, or Firm*—Oblon, Spivak, McClelland, Maier & Neustadt

[57] ABSTRACT

A vulcanizable fluororubber composition which comprises:
(a) a fluorine-containing elastomeric copolymer of vinylidene fluoride with at least one other ethylenically unsaturated monomer copolymerizable therewith;
(b) an organic peroxide;
(c) a polyfunctional compound;
(d) at least one member selected from the group consisting of bivalent metal hydroxides and bivalent metal oxides; and
(e) an organic base.

8 Claims, No Drawings

VULCANIZABLE FLUORORUBBER COMPOSITION

The present invention relates to a vulcanizable fluororubber composition intended for vulcanization with an organic peroxide.

In recent years, reflecting the trend for high power of automobile engines, the engine temperature tends to increase and a high performance engine oil (SF, SG) tends to be used. In such a field, a rubber material having higher heat resistance and engine oil resistance is required, and an attention has been drawn to a fluororubber of the type to be vulcanized with an organic peroxide, as a material which meets such requirements.

For a fluoropolymer of the type vulcanizable with an organic peroxide, vulcanization treatment is known in which a polyfunctional compound such as triallyl isocyanurate is used as a vulcanization accelerator (e.g. Japanese Unexamined Patent Publication No. 102849/1973). Further, a fluoropolymer is known wherein bromine and iodine compounds are present in the polymer chain as vulcanizable site monomers to facilitate the vulcanization with an organic peroxide (e.g. Japanese Examined Patent Publication No. 52173/1985, No. 4115/1978 and No. 1585/1979).

Further, it is known that a fluororubber vulcanizable with an organic peroxide can be obtained by alkali treatment of an elastomeric copolymer containing vinylidene fluoride in the presence of an onium salt (e.g. Japanese Unexamined Patent Publication No. 97347/1986).

Conventional fluororubber of the type to be vulcanized with an organic peroxide has poor vulcanizability, which cannot adequately be improved by mere combination with a polyfunctional compound (Japanese Unexamined Patent Publication No. 102849/1973), and it has poor vulcanizate properties such as compression set resistance. On the other hand, adequate vulcanizability and vulcanizate properties can be obtained by the introduction of vulcanizable sites by copolymerization with a monomer having a vulcanizable site and by alkali treatment. However, such introduction of vulcanizable sites requires use of an expensive monomer and involves cumbersome treating steps, whereby the production costs increase.

Thus, no vulcanizable fluororubber composition to be vulcanized with an organic peroxide, which has adequate vulcanizability and vulcanizate properties, has been obtained by simple readily applicable compounding technique only.

The present invention has been made to solve the above-mentioned problems and provides a vulcanizable fluororubber composition which comprises:

(a) a fluorine-containing elastomeric copolymer of vinylidene fluoride with at least one other ethylenically unsaturated monomer copolymerizable therewith;
(b) an organic peroxide;
(c) a polyfunctional compound;
(d) at least one member selected from the group consisting of bivalent metal hydroxides and bivalent metal oxides; and
(e) an organic base.

Now, the present invention will be described in detail with reference to the preferred embodiments.

In the present invention, the fluorine-containing elastomeric copolymer (a) is composed of vinylidene fluoride and at least one ethylenically unsaturated monomer copolymerizable therewith. Here, the ethylenically unsaturated monomer copolymerizable with vinylidene fluoride includes hexafluoropropylene, pentafluoropropylene, propylene, trifluoroethylene, tetrafluoroethylene, trifluorochloroethylene, ethylene, vinyl fluoride and perfluoro(alkyl vinyl ether) such as perfluoro(methyl vinyl ether), perfluoro(propyl vinyl ether) and perfluoro(hexyl vinyl ether).

Among them, a vinylidene fluoride-tetrafluoroethylene-propylene copolymer, a vinylidene fluoride-tetrafluoroethylene-hexafluoropropylene copolymer and a vinylidene fluoride-hexafluoropropylene copolymer are preferably employed.

Here, the proportion of vinylidene fluoride for copolymerization is suitably selected depending upon the desired physical properties, the type of the copolymerizable ethylenically unsaturated monomer, etc. However, if the proportion of vinylidene fluoride is too small, the vulcanizability tends to be inadequate, and the vulcanizate properties will be poor. On the other hand, if the proportion is too high, there will be a deterioration in the physical properties such as lack of the elastomeric properties or a deterioration in the alkali resistance of the fluorine-containing copolymer. The proportion of vinylidene fluoride is usually from 2 to 90 mol %, preferably from 5 to 85 mol %.

It is particularly preferred to employ a vinylidene fluoride-tetrafluoroethylene-propylene copolymer, since it is thereby possible to obtain a vulcanized fluororubber having excellent engine oil resistance. Particularly preferred is a three component copolymer of vinylidene fluoride-tetrafluoroethylene-propylene type which comprises from 3 to 70 mol % of vinylidene fluoride units, from 20 to 60 mol % of tetrafluoroethylene units and from 20 to 50 mol % of propylene units, whereby it is possible to obtain well balanced properties such as the engine oil resistance of the vulcanized fluororubber, vulcanization behavior and physical properties of the vulcanized fluororubber.

With the fluorine-containing elastomeric copolymer (a) in the composition of the present invention, excellent vulcanization behavior can be obtained even without introduction of readily vulcanizable sites which are usually introduced for the conventional vulcanization with an organic peroxide, and a vulcanizate having excellent physical properties can be obtained. Further, a vulcanizate having excellent physical properties can also be obtained when a fluorine-containing elastomeric copolymer having readily vulcanizable sites is employed. Here, the readily vulcanizable sites are meant for bromine, iodine and a double bond introduced in the polymer chain. Such readily vulcanizable sites can be introduced by copolymerizing a monomer capable of providing a readily vulcanizable site (such as an iodine compound or a bromine compound), or by conducting after treatment to provide such readily vulcanizable sites (such as heat treatment or an alkali treatment in the presence of an onium salt).

The fluorine-containing elastomeric copolymer (a) can be prepared by various polymerization systems such as bulk polymerization, suspension polymerization, emulsion polymerization or solution polymerization of predetermined monomers. A catalytic polymerization method using a free radical initiator, an ionizing radiation polymerization method or a redox polymerization method may suitably be employed.

The organic peroxide (b) is used as a vulcanizing agent in the present invention and is an organic compound having a ⁺O—O⁺ bond, including peroxyketals, dialkyl peroxides, diacyl peroxides, peroxyesters and hydroperoxides. Specific examples include benzoyl peroxide, dicumylperoxide, di-t-butyl peroxide, 2,5-dimethyl-2,5-di(t-butylperoxy)hexane, 2,5-di(t-butylperoxy)hexyne, α,α'-bis(t-butylperoxy-m-isopropyl)-benzene, 1,1'-bis(t-butylperoxy)-3,3,5-trimethylcyclohexane and 2,5-dimethyl-2,5-di(benzoylperoxy)hexane. Among them, α,α'-bis(t-butylperoxy-m-isopropyl)benzene and 2,5-dimethyl-2,5-di(t-butylperoxy)hexane are preferably employed. Such an organic peroxide is used usually in an amount of from 0.5 to 10 parts by weight, preferably from 1 to 5 parts by weight per 100 parts by weight of the fluorine-containing elastomeric copolymer.

The polyfunctional compound (c) is used as a vulcanization promotor, and it includes a polyallyl compound, a methacrylate compound, a divinyl compound, a polybutadiene, an oxime compound and a sulfur compound. Among them, preferred is a polyallyl compound such as triallyl isocyanurate or triallyl cyanurate. Such a polyfunctional compound is used usually in an amount of from 0.5 to 20 parts by weight, preferably from 1 to 10 parts by weight per 100 parts by weight of the fluorine-containing elastomeric copolymer.

In the composition of the present invention, it is important that at least one member (d) selected from the group consisting of bivalent metal hydroxides and bivalent metal oxides and an organic base (e) are incorporated. By the incorporation of such the organic base (e) and at least one member (d) selected from the group consisting of bivalent metal hydroxides and bivalent metal oxides, a vulcanizate having excellent physical properties can be obtained by an organic peroxide even when the fluorine-containing elastomeric copolymer does not contain readily vulcanizable sites.

The bivalent metal hydroxides and bivalent metal oxides may be hydroxides and oxides of magnesium, calcium, lead and zinc. Such a metal hydroxide or oxide is used usually in an amount of from 1 to 20 parts by weight, preferably from 2 to 10 parts by weight per 100 parts by weight of the fluorine-containing elastomeric copolymer.

The organic base (e) serves to facilitate the dehydrofluorination reaction from the fluorine-containing elastomeric copolymer during the vulcanization and thus let the vulcanization proceed smoothly. Specifically such an organic base may be (1) a compound represented by the formula:

$$\begin{array}{c} R_1 \\ R_2-N \\ R_3 \end{array} \text{ or }$$

$$\begin{array}{c} R_4 \\ R_5 \end{array} N-R_8-N \begin{array}{c} R_6 \\ R_7 \end{array}$$

wherein each of $R_1$ to $R_3$ which may be the same or different is an alkyl group having from 1 to 20 carbon atoms or an allyl group, or two groups out of $R_1$, $R_2$ and $R_3$ may together form a ring structure, each of $R_4$, $R_5$, $R_6$ and $R_7$ which may be the same or different is an alkyl group having from 1 to 6 carbon atoms, or $R_4$ and $R_6$ and/or $R_5$ and $R_7$ may together form a ring structure, and $R_8$ is an alkylene group having from 1 to 21 carbon atoms, or its inorganic or organic salt, or its quaternary ammonium compound with an alkyl halide; (2) a compound of the formula:

$$\begin{array}{c} R_9 \\ R_{10}-P \\ R_{11} \end{array}$$

wherein each of $R_9$ to $R_{11}$ which may be the same or different is an alkyl group having from 1 to 20 carbon atoms, an aryl group or an alkylamino group, or two groups out of $R_1$, $R_2$ and $R_3$ may together form a ring structure, or its inorganic or organic salt, or its quaternary phosphonium compound with an alkyl halide; and (3) a cyclic compound of the formula:

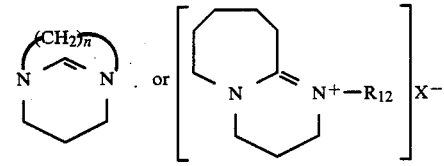

wherein n is an integer of from 3 to 5, $R_{12}$ is an alkyl group having from 1 to 20 carbon atoms or an aryl group, and X is an anion such as a halide, a hydroxylate, an alkoxylate, a carboxylate, a phenoxide, a sulfonate, a sulfate, a sulfite or a carbonate, or its inorganic or organic salt, or its quaternary ammonium compound with an alkyl halide.

Specifically, it includes a p-toluene sulfonic acid salt of 1,8-diazabicyclo(5,4,0)undecene-7, an octyl acid salt of 1,8-diazabicyclo(5,4,0)undecene-7, 8-methyl-1,8-diazabicyclo(5,4,0)-7-undecenium chloride, benzyltriphenylphosphonium chloride, diethylaminobenzyldiphenylphosphonium chloride and benzyltrimethylammonium chloride. It is particularly preferred to employ an organic acid salt of the cyclic compound of the formula (3), whereby the vulcanization behavior will be most excellent. Among them, an organic salt such as a p-toluene sulfonic acid salt or an octyl acid salt of 1,8-diazabicyclo(5,4,0)undecene-7 is preferably used.

The organic base (e) is used usually in an amount of from 0.5 to 10 parts by weight, preferably from 1 to 5 parts by weight relative to 100 parts by weight of the fluorine-containing elastomeric copolymer. If the amount is less than 0.5 parts by weight, no adequate vulcanization density and vulcanizate properties can be obtained. On the other hand, if the amount exceeds 10 parts by weight, the moldability such as a scorch phenomenon will be adversely affected, and the vulcanizate properties such as chemical resistance tend to deteriorate.

To the composition of the present invention, a reinforcing material such as carbon black, fine silica, clay or talc, other filler, a pigment, an antioxidant or a stabilizer which is commonly used during the preparation of conventional vulcanized rubbers may be added and compounded.

For the preparation of the composition of the present invention, it is advisable to thoroughly mix the fluorine-containing elastomeric copolymer, the organic peroxide, the polyfunctional compound, the bivalent metal hydroxide and/or oxide, the organic base and, if necessary, other additives to obtain a uniform mixture. Such mixing can be conducted by a roll mill for kneading rubber or a Banbury mixer commonly used heretofore.

There is no particular restriction as to the operational condition for mixing. However, it is usual to conduct kneading at a temperature of from 30° to 80° C. for from 10 to 60 minutes, whereby the additives can adequately be dispersed and mixed into the fluorine-containing elastomeric copolymer.

Further, such additives may suitably be dissolved and dispersed in a suitable solvent to make a suspension solution. It is further possible to conduct the mixing in a solvent from the beginning, which is so-called wet-mixing. In such a case, a blend composition can be obtained in a solution state by means of such a mixer as a roll mill, a ball mill or a homogenizer. The mixing operation is preferably conducted by properly selecting the optimum conditions depending upon the materials used and the type or purposes of the additives.

The composition of the present invention may be molded into such a molded product as a sheet, a pipe, a rod, a tube, an angle, a channel, a coating cloth or a coating plate by a molding method including not only usual molding with a mold die but also extrusion, transfer, roll coating, brush coating and dipping. Further, by other various molding methods, it may be molded into products having special shapes or specially molded products such as sponge-like rubber. The composition of the present invention thus molded is then subjected to suitable vulcanization to obtain a vulcanizate. Thus, a vulcanized rubber product is prepared from the composition of the present invention.

In the present invention, the vulcanization can be conducted by an operation commonly employed for vulcanization. For example, it is possible to employ a method wherein a shaped product is heated under pressure in a mold, or a method wherein the composition is molded by extrusion, calendar rolling or injection molding, followed by heating in a heating furnace or in a steam oven. With respect to the operational conditions for vulcanization, it is advisable to select the optimum conditions depending upon the starting materials or the compound composition. The temperature for the vulcanization is usually at a level of from 80° to 250° C., preferably from 120° to 200° C. There is no particular restriction as to the heating time. However, it is usually within a range of from one minute to 3 hours, preferably from 5 minutes to 2 hours depending upon the type of the organic peroxide. As the heating temperature is raised, the heating time can be shortened. It is possible to employ reheating treatment of the resulting vulcanizate, which may serve for the improvement of the physical properties. For example, it is possible to employ reheating treatment at a temperature of from 150° to 250° C., preferably from 180° to 230° C. for from 2 to 25 hours.

In the present invention, the role of the organic base and the bivalent metal hydroxides and/or oxides is to introduce unsaturated groups suitable for vulcanization with an organic peroxide, which is evident from the absorption at 3,120 cm$^{-1}$ and 1,722 cm$^{-1}$ by the infrared analysis of the product obtained by heat treatment (at 160°–200° C.) of a fluorine-containing elastomeric copolymer combined with these compounds i.e. a p-toluene sulfonic acid salt of 1,8-diazabicyclo(5,4,0)undecene-7 and calcium hydroxide. Further, when a blend having an organic peroxide and a polyfunctional compound incorporated in addition to these organic base and bivalent metal hydroxides and/or oxides, is subjected to heat treatment, the intensity of absorption at 3,120 cm$^{-1}$ and 1,722 cm$^{-1}$ by the infrared analysis becomes weak and gelation takes place. This indicates that the vulcanization with the organic peroxide by using the unsaturated groups is taking place.

Now, the present invention will be described in further detail with reference to Examples and Comparative Examples. However, it should be understood that the present invention is by no means restricted to such specific Examples. The vulcanization behavior of the composition and the physical properties of the vulcanizate were measured as follows.

(1) Vulcanization behavior

The vulcanization curve was measured at 170° C by JSR II model curelastometer manufactured by Imanaka Kikai Kogyo K.K. On this basis, the effective torque ΔTR corresponding to the vulcanization density and the optimum vulcanization time t90 were calculated.

(2) Physical properties of the vulcanizate

By using a vulcanizable composition, a sheet of 1 mm in thickness and a test piece for the measurement of compression set were molded and vulcanized under a pressure of 100 kg/cm$^2$G at a temperature of 170° C. for 15 minutes and then subjected to secondary vulcanization at 230° C. for 24 hours to obtain test pieces, which were subjected to various measurements.

The measurements of the tensile strength, the elongation, the 100% modulus and the hardness were conducted in accordance with JIS K-6301, and the measurement of the compression set was conducted in accordance with ASTM D-395-78.

EXAMPLE 1

By an emulsion polymerization method, a latex containing 30.0% by weight of a three component copolymer comprising vinylidene fluoride/tetrafluoroethylene/propylene in a molar ratio of 34.8/38.9/26.3, was prepared. One kg of this latex was dropwise added into an aqueous sodium chloride solution for coagulation, and the coagulated product was washed and dried to obtain 300 g of a white elastomeric copolymer.

50 g of this elastomeric copolymer, 1 g of 2,5-dimethyl-2,5-di-(t-butylperoxy)hexane, 2.5 g of triallyl isocyanurate, 2.5 g of calcium hydroxide, 1.5 g of a p-toluene sulfonic acid salt of 1,8-diazabicyclo(5,4,0)undecene-7 and 17.5 g of MT carbon were kneaded by a 4 inch roll to obtain a vulcanizable composition.

The vulcanization behavior of the composition and the physical properties of the vulcanizate are shown in Table 1.

EXAMPLE 2

The operation was conducted in the same manner as in Example 1 except that 1.5 g of an octylic acid salt of 1,8-diazabicyclo(5,4,0)undecene-7 was used instead of the p-toluene sulfonic acid salt of 1,8-diazabicyclo(5,4,0)undecene-7, to obtain a vulcanizable composition. The vulcanization behavior of the composition and the physical properties of the vulcanizate are shown in Table 1.

COMPARATIVE EXAMPLE 1

The operation was conducted in the same manner as in Example 1 except that no p-toluene sulfonic acid salt of 1,8-diazabicyclo(5,4,0)undecene-7 was used, to obtain a vulcanizable composition. The vulcanization behavior of the composition and the physical properties of the vulcanizate are shown in Table 1.

COMPARATIVE EXAMPLE 2

The operation was conducted in the same manner as in Example 1 except that no calcium hydroxide was used, to obtain a vulcanizable composition. The vulcanization behavior of the composition and the physical properties of the vulcanizate are shown in Table 1.

TABLE 1

|  |  | Example 1 | Example 2 | Comp. Example 1 | Comp. Example 2 |
|---|---|---|---|---|---|
| Composition (parts by weight) | Elastomeric copolymer (1) | 100 | 100 | 100 | 100 |
|  | 2,5-dimethyl-2,5-di-(t-butylperoxy)hexane | 2 | 2 | 2 | 2 |
|  | Triallyl isocyanurate | 5 | 5 | 5 | 5 |
|  | Calcium hydroxide | 5 | 5 | 5 | — |
|  | MT carbon black | 35 | 35 | 35 | 35 |
|  | Organic base-1 (2) | 3 | — | — | 3 |
|  | Organic base-2 (3) | — | 3 | — | — |
| Vulcanization behavior | Effective torque ΔTR(kgf) | 4.0 | 4.8 | 0.9 | 0.7 |
|  | Optimum vulcanization time t 90 (min) | 7.5 | 5.0 | 4.5 | 3.5 |
| Physical properties of the vulcanizate | Tensile strength (kg/cm$^2$) | 156 | 162 | 128 | Not measurable (Vulcanizate was not obtained.) |
|  | Elongation (%) | 200 | 153 | 440 |  |
|  | 100% Modulus (kg/cm$^2$) | 75.3 | 100.1 | 38.2 |  |
|  | Hardness (A-type) | 76 | 73 | was not |  |
|  | Compression set (40) 200° C. × 70 hrs | 35.2 | 33.2 | 78.2 |  |

1 Elastomeric copolymer of vinylidene chloride/tetrafluoroethylene/propylene in a molar ratio of 34.8/38.9/26.3
2 Organic base-1: p-Toluene sulfonic acid salt of 1,8-diazabicyclo(5,4,0)undecene-7
3 Organic base-2: Octylic acid salt of 1,8-diazabicyclo(5,4,0)undecene-7

EXAMPLE 3

50 g of Tecnoflon TN (a vinylidene fluoride/hexafluoropropylene/tetrafluoroethylene copolymer), 0.5 g of 2,5-dimethyl-2,5-di(t-butylperoxy)hexane, 2.5 g of triallyl cyanurate, 2.5 g of calcium hydroxide, 0.75 g of a p-toluene sulfonic acid salt of 1,8-diazabicyclo(5,4,-0)undecene-7 and 12.5 g of MT carbon were kneaded by a 4 inch roll to obtain a vulcanizable composition.

With respect to the vulcanization properties of the composition, ΔTR as measured by the curastometer was 3.8 (kgf), and t90 was 8.0 (min.). The vulcanizate had a tensile strength of 153 (kg/cm$^2$), an elongation of 200 (%) and a hardness of 72 (A-type).

EXAMPLE 4

50 g of Tecnoflon NM (a vinylidene fluoride/hexafluoropropylene copolymer), 0.5 g of 2,5-dimethyl-2,5-di(t-butylperoxy)hexane, 2.5 g of triallyl cyanurate, 2.5 g of calcium hydroxide, 1.5 g of benzyl triphenylphosphonium chloride and 12.5 g of MT carbon were kneaded to obtain a vulcanizable composition.

With respect to the vulcanization properties of the composition, ΔTR as measured by the curastometer was 3.5 (kgf), and t90 was 11.8 (min.). The vulcanizate had a tensile strength of 137 (kg/cm$^2$), an elongation of 129 (%) and a hardness of 72 (A-type).

COMPARATIVE EXAMPLE 3

The operation was conducted in the same manner as in Example 1 except that no p-toluene sulfonic acid salt of 1,8-diazabicyclo(5,4,0)undecene-7 was used, to obtain a vulcanizable composition.

With respect to the vulcanization properties of the composition, ΔTR as measured by the curastometer was 1.2 (kgf), and t90 was 17.2 (min.), thus indicating poor vulcanization properties.

EXAMPLE 5

By an emulsion polymerization method, a two component copolymer of vinylidene fluoride/perfluoro(hexylvinylether) in a molar ratio of 80.7/19.3 having an intrinsic viscosity of 1.75 dl/g as measured at 30° C. in a solvent mixture of trichlorofluoroethane/DMF (in a weight ratio of 9/1), was prepared.

50 g of this copolymer, 1.0 g of 2,5-dimethyl-2,5-di(t-butylperoxy)hexane, 2.5 g of triallyl cyanurate, 2.5 g of calcium hydroxide, 1.5 g of a p-toluene sulfonic acid salt of 1,8-diazabicyclo(5,4,0)undecene-7 and 17.5 g of SRF.LS carbon were kneaded to obtain a vulcanizable composition.

With respect to the vulcanization properties of the composition, ΔTR as measured by the curastometer was 3.0 (kgf), and t90 was 11.2 (min.), thus indicating superior properties as compared with the composition wherein no organic base was used (ΔTR: 0.8 kgf).

EXAMPLE 6

The operation was conducted in the same manner as in Example 1 except that 6 parts by weight of magnesium oxide was used instead of calcium hydroxide, to obtain a vulcanizable composition.

With respect to the vulcanization properties of the composition, ΔTR was 4.6 (kgf), and t90 was 10.7 (min.). The vulcanizate had a tensile strength of 160 kg/cm$^2$, an elongation of 183%, a 100% modulus of 85.8 kg/cm$^2$, a hardness (A-type) of 77 and a permanent compression set (200° C. for 7 hours) of 33.8%.

The composition of the present invention has remarkably improved vulcanizability and is not only useful as a stock composition for vulcanized rubber having excellent physical properties but also advantageous from the viewpoint of the production cost since it is thereby possible to accomplish such an improvement merely by adjusting the blend composition. Further, by virtue of various excellent physical properties of the vulcanizate, it is useful in a wide range of applications including, for example, radiators, O-rings of engines, gaskets, sealing materials, tubes, etc. for automobiles, heat exchanger gaskets, diaphragms, etc. for food plant machines and equipments, and gaskets, sealing materials, hoses, etc. for chemical plant machines and equipments.

I claim:

1. A vulcanizable fluororubber composition which comprises:
   (a) a fluorine-containing elastomeric copolymer of vinylidene fluoride with at least one other ethylenically unsaturated monomer copolymerizable therewith, wherein the fluorine-containing elastomeric copolymer does not contain bromine, iodine or a double bond;
   (b) an organic peroxide;
   (c) a polyfunctional compound;
   (d) at least one member selected from the group consisting of bivalent metal hydroxides and bivalent metal oxides; and
   (e) an organic base.

2. The vulcanizable fluororubber composition according to claim 1, wherein the fluorine-containing elastomeric copolymer (a) contains from 2 to 90 mol % of vinylidene fluoride units.

3. The vulcanizable fluororubber composition according to claim 1, wherein the fluorine-containing elastomeric copolymer (b) is a vinylidene fluoride-tetrafluoroethylene-propylene type three component copolymer which comprises from 3 to 70 mol % of vinylidene fluoride units, from 20 to 60 mol % of tetrafluoroethylene units, and from 20 to 50 mol % of propylene units.

4. The vulcanizable fluororubber composition according to claim 1, wherein the polyfunctional compound (c) is a polyallyl compound.

5. The vulcanizable fluororubber composition according to claim 1, wherein the organic base (d) is an organic acid salt of 1,8-diazabicyclo(5,4,0)undecene-7.

6. The vulcanizable fluororubber composition according to claim 1, which comprises 100 parts by weight of the fluorine-containing elastomeric copolymer (a), from 0.1 to 10 parts by weight of the organic peroxide (b), from 0.5 to 20 parts by weight of the polyfunctional compound (c), from 1 to 20 parts by weight of the at least one member (d) and from 1 to 20 parts by weight of the organic base (e).

7. The vulcanizable fluororubber composition according to claim 1, wherein the organic peroxide (b) is at least one member selected from the group consisting of peroxyketals, dialkyl peroxides, diacyl peroxides, peroxyesters and hydroperoxides.

8. The vulcanizable fluororubber composition according to claim 1, wherein bivalent metals of the bivalent metal hydroxides and bivalent metal oxides in (d) are at least one element selected from the group consisting of magnesium, calcium, lead and zinc.

* * * * *